United States Patent [19]

Holly

[11] Patent Number: 4,744,658
[45] Date of Patent: May 17, 1988

[54] WAVEFRONT SENSOR

[75] Inventor: Sandor Holly, Woodland Hills, Calif.

[73] Assignee: Rockwell International Corporation, El Segundo, Calif.

[21] Appl. No.: 4,391

[22] Filed: Jan. 16, 1987

[51] Int. Cl.$^4$ ............................................. G01B 9/02
[52] U.S. Cl. ................................. 356/351; 356/359
[58] Field of Search ............... 356/350, 351, 353, 354, 356/359

[56] References Cited

U.S. PATENT DOCUMENTS

| | | | |
|---|---|---|---|
| 3,825,345 | 7/1974 | Lorenz | 356/85 |
| 3,924,952 | 12/1975 | Marechal et al. | 356/106 |
| 4,003,658 | 1/1977 | Kelsall | 356/353 |
| 4,141,652 | 2/1979 | Feinleib | 356/121 |
| 4,188,122 | 2/1980 | Massie et al. | 356/349 |
| 4,273,445 | 6/1981 | Thompson et al. | 356/350 |
| 4,273,446 | 6/1981 | Pohle | 356/354 |
| 4,326,800 | 4/1982 | Fitts | 356/152 |
| 4,346,999 | 8/1982 | Massie | 356/349 |
| 4,441,019 | 4/1984 | Hardy | 250/201 |
| 4,444,503 | 4/1984 | Schiffner | 356/350 |
| 4,474,467 | 10/1984 | Hardy et al. | 356/353 |
| 4,480,915 | 11/1984 | Arditty et al. | 356/350 |
| 4,518,854 | 5/1985 | Hutchin | 250/201 |
| 4,575,248 | 3/1986 | Horwitz et al. | 356/353 |
| 4,624,569 | 11/1986 | Kwon | 356/354 |

OTHER PUBLICATIONS

Wyant, J. C. et al, "Phase Measurement Systems for Adaptive Optics", University of Arizona, Tucson, Ariz. 85721.
Bareket, N. et al, "Wavefront Sensors and Deformable Mirrors for Visible Wavelengths", SPIE vol. 228, Active Optical Devices & Applications (1980), pp. 4–13.
Gagliardi, R. M., "Optimal Post Detection Phase Estimation for Wavefront Sensing", Dept. of Eng., U. of So. Cal, Los Angeles, CA 90089-0272.
Bareket, N. et al, "Wavefront Sensing", Proceedings of SPIE, vol. 351, Aug. 24–25, 1982, San Diego, Calif.
Yao, L. et al, "Pulsed-Mode Laser Sagnar Interferometry with Applications in Nonlinear Optics and Optical Switching", Applied Optics, vol. 25, No. 2, Jan. 1986.

*Primary Examiner*—Davis L. Willis
*Assistant Examiner*—Matthew W. Koren
*Attorney, Agent, or Firm*—H. Fredrick Hamann; Harry B. Field; Lawrence N. Ginsberg

[57] ABSTRACT

A method and apparatus 10 for sensing and measuring the quality of the wavefront of a substantially collimated incoming optical beam 12. Incoming beam 12 is directed through a polarizer 14 and toward a polarizing beam splitter 14 where it is separated into an S-polarized beam 18 and a P-polarized beam 20. Beams 18,20 are directed in opposite directions along a common closed path of a modified cyclic interferometer 22. This closed path includes mirrors 24,26 and focusing means 28,30 for focusing the P- and S-polarized beams 18,20 at a common focal region on the path and for recollimating each beam 18,20 after it passes through the focal region. At the focal region is located a specially constructed polarizer component 32 with an optical aperture 34. The aperture 34 is centered on the centroid of the focused beams and is angularly oriented about an optical axis of the closed path so that it transmits substantially all of the beam traveling in one direction and is an effective optical spatial filter for the beam traveling in the opposite direction. After being recollimated and returned to beam splitter 16 the beams 18,20 are recombined in a common path 36 and oriented in a common plane of polarization by polarizer 38 thereby causing them to interfere. The resultant fringe field is read by reader 40 and analyzed by receiver electronics 42, control electronic means 44 and memory device means 46. The apparatus 10 can operate with either a continuous wave or a pulsed wave of incident optical radiation.

26 Claims, 2 Drawing Sheets

WAVEFRONT SENSOR

BACKGROUND OF THE INVENTION

1. Field of the Invention

This invention relates to wavefront sensors and more particularly to a wavefront sensor which can operate with either a continuous or pulsed incoming optical beam and which utilizes a modified cyclic interferometer including a polarizer with an optical aperture.

2. Description of the Prior Art

A light beam can be significantly distorted as it passes through the atmosphere or other transmission media. This problem, for example, has limited the resolution of images received by telescopes of stellar bodies deep in space. In addition, atmospheric distortion has posed a severe restriction on attempts to efficiently irradiate objects with laser beams especially when those objects are located great distances from the emitting laser. Other distortions present in practical optical systems also add to beam quality degradation resulting in loss of system performance.

Different wavefront correction systems are used in overcoming such distortions. A critical part of such wavefront correction system is a wavefront sensor. Generally, the main objective of wavefront sensors is to measure the spatial distribution of any wavefront deformations (i.e., wavefront deviations from a given surface such as a flat or spherical surface). Wavefront deformation is expressed as the optical path difference (OPD) in terms of the optical wavelength.

The different types of wavefront sensors may be categorized into two groups—those that measure the OPD distribution directly and those that measure this distribution indirectly. The indirect method involves first measuring the wavefront slope distribution and then from the wavefront slope distribution calculating the OPD distribution. The wavefront slope error distribution is commonly measured by either using a Hartmann sensor approach or one of the different forms of shearing interferometric concepts (i.e., linear or radial shearing). Examples of these approaches are in the following patents:

U.S. Pat. No. 4,141,652 entitled, "Sensor System for Detecting Wavefront Distortion in a Return Beam of Light," issued to J. M. Fineleib;

U.S. Pat. No. 4,518,854 entitled, "Combined Shearing Interferometer and Hartmann Wavefront Sensor," issued to R. A Hutchin;

U.S. Pat. No. 4,575,248 entitled, "Wavefront Sensor Employing Novel D. C. shearing Interferometer," issued to B. A. Horwitz and A. J. MacGovern.

These indirect methods require calculations to convert slope data into OPD data. These calculations can be made in either real time or off-line and with either dedicated hard wired circuitry or in software. Hard wired data processing is designed to respond to a specific task, is expensive and requires bulky equipment. The conversion of data by using different software based schemes tends to be time consuming and/or requires high performance computing equipment.

Direct measurement of the optical path length with respect to a given reference surface (such as a flat) is most often made by a wavefront sensor that is based on one of several different interferometric schemes. There are double path and common path interferometer-based schemes. Examples include Twyman-Greene and Mach-Zehnder configurations.

The accuracy of double path methods, by their nature, relies heavily on the quality of the components. Furthermore, the prior art configurations, whether common or double path, require complicated optical systems and most of them can only be utilized for incident beams which are continuous.

An example of the Twyman-Greene approach can be found in U.S. Pat. No. 4,346,999 entitled, "Digital Heterodyne Wavefront Analyzer," issued to N. A. Massie.

Electronic interferometric techniques, using heterodyne measurement methods such as that described in the Massie '999 patent, or in U.S. Pat. No. 4,188,122 entitled, "Interferometer," issued to S. Holly and N. A. Massie have been recently introduced for facilitating electronic readout of OPD values from optical fringe fields thereby resulting in greatly improved reproducibility and accuracy with high spatial, temporal and OPD resolutions.

SUMMARY AND OBJECTS OF THE INVENTION

In view of the above, it is an object of the invention to provide a wavefront sensor scheme that can operate with either a continuous wave of incident optical radiation or a pulsed wave of incident optical radiation.

It is another object to provide a sensor with an output which can be easily interpreted.

Yet another object is to provide a wavefront sensor with a simple geometry, that requires a minimum number of components and which is easy to align.

Other objects, advantages and novel features of the present invention will become apparent from the following detailed decription of the invention when considered in conjunction with the accompanying drawing.

The invention, in its broadest aspects, comprises directing a substantially collimated incoming optical beam toward a polarizing beam splitter and thereby separating it into an S-polarized beam and a P-polarized beam. The polarized beams are directed along a common closed path but in opposite directions. This closed path includes focusing means for focusing the P- and S-polarized beams at a common focal region on the common path and for recollimating each beam after it passes through the focal region. At the focal region is located a specially constructed polarizer component with an optical aperture. The aperture is centered on the centroid of the focused beams and is angularly oriented about an optical axis of the closed path so that it transmits substantially all of the beam traveling in one direction and is an effective optical spatial filter for the beam traveling in the opposite direction. After being recollimated, the beams are recombined and their polarizations oriented in a common plane of polarization thereby causing them to interfere. The resulting optical interference fringe pattern is then read to determine the quality of the incoming optical beam.

In its narrower aspects, the polarizer/aperture component comprises a transparent, optical substrate with a dense array of submicroscopic, parallel, conductive strips formed on one side thereon. In the center of the component a small circular portion of the array is removed to form an optical aperture on the order, in size, of the diffraction-limited spot of the focused beams. The substrate preferably also includes anti-reflective coatings.

BRIEF DESCRIPTION OF THE DRAWINGS

The same elements or parts throughout the figures of the drawings are designated by the same reference characters.

DETAILED DESCRIPTION OF THE INVENTION

Figure 1:
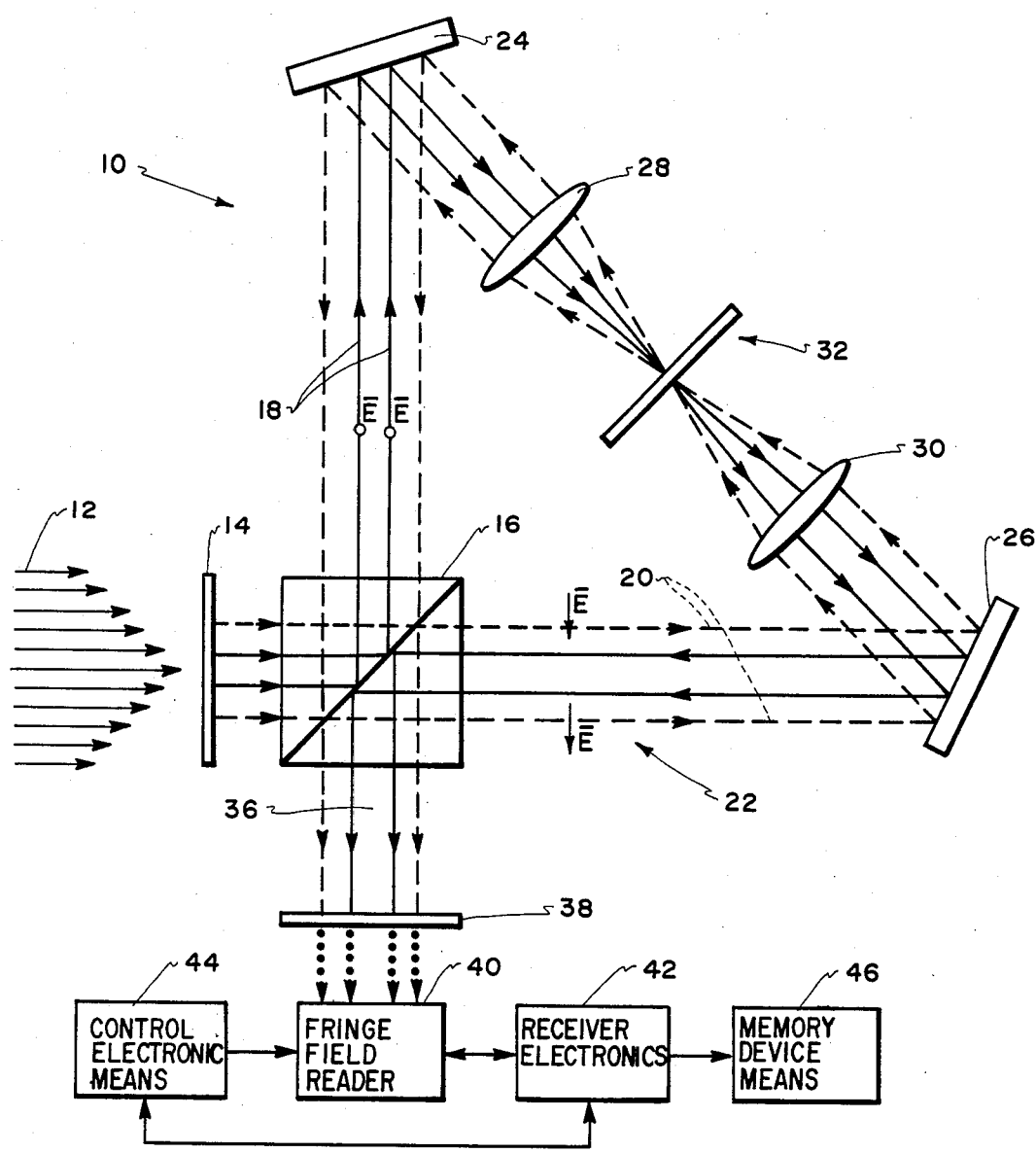
FIG. 1 is a schematic illustration of an embodiment of the wavefront sensor of the present invention utilizing a modified cyclic interferometer with an even number of reflections for each beam.

Referring to FIG. 1, an embodiment of the present invention is designated generally as 10. The wavefront to be measured of the incoming optical beam 12 enters through a conventional linear polarizer 14 which is oriented approximately at 45° with respect to the optical plane of the apparatus 10. The incoming wavefront may either be a continuous wave or a pulsed wave. For most applications the source of the beam 12 is sufficiently distant from the apparatus 10 so that the beam 12 is substantially collimated. (The system may accommodate sources that are near by providing minor adjustments to one of the optical components of apparatus 10.) After being polarized the wavefront is split by a polarization cube or polarizing beam splitter 16. The S-polarized beam ($\overline{E}$ field perpendicular to plane of incidence) designated by reference numeral 18 is reflected from the beam splitter 16 at 90° and the P-polarized component ($\overline{E}$ field in plane of incidence) designated by reference numeral 20 is transmitted. The relative intensities of these two beams are adjustable by rotation of the polarizer 14.

Both the S-polarized beam 18 and the P-polarized beam 20 enter a modified cyclic (or Sagnac) interferometer generally designated as 22. In this interferometer 22 the beams 18,20 are directed along a common closed path but in opposite directions. The modified cyclic interferometer 22 includes two mirrors 24,26, two identical focusing lenses 28,30 and a specially constructed polarizing component 32. The two focusing lenses 28,30 provide high optical quality 1:1 beam expansion. Component 32, illustrated in detail in FIGS. 2 and 3 and more fully described below, has an optical aperture 34.

Mirror 26 is positioned to receive the P-polarized beam 20 from the polarizing beam splitter and directing it toward mirror 24. Mirror 24 is positioned to receive the S-polarized beam 18 from the polarizing beam splitter 16 and directing it toward mirror 26. The polarizer/aperture component 32 is located between the two mirrors 24,26. The two diffraction limited focusing lenses 28,30 are each positioned between the polarizer/aperture component 32 and a respective mirror. Polarizer/aperture component 32 is located in the focal region formed by lenses 28,32 and is positioned such that the aperture 34 is centered on the centroid of the focused beam.

In one of the two possible orthogonal angular orientations, the polarizer/aperture component 32 is angularly oriented such that the clockwise propagating S-polarized wave 18 passes through it unaltered while the counter-clockwise propagating P-polarized wave 20 is effectively spatially filtered. Component 32 is oriented in such a manner by positioning its plane approximately perpendicular to the optical axis of the modified cyclic interferometer 22 and angularly orienting the component 32 about the optical axis such that its polarization axis is in the plane of apparatus 10. After each of the two beams 18,20 completes its round trip in the interferometer 22, they are recombined along a common path 36 as the polarizing cube 16 directs both through its exit port.

The P-polarized and the S-polarized beams are orthogonally polarized as they pass along common path 36. They are then directed into a conventional polarizer, designated 38, typically oriented at approximately 45° with respect to the optical plane of the apparatus 10. The components of the two beams that are transmitted through polarizer 38 are then polarized in a common plane of polarization and interference between the two beams will occur.

The resultant fringe field may be read and analyzed by either visual or electronic means. In either case a fringe field reader 40 is used to convert the intensity distribution to electronic signals under the control of receiver electronics 42. Control electronic means 44 are used in a pulsed mode of operation to synchronize the fringe field reader 40 with the incoming string of pulses of optical radiation. Memory device means 46 such as phosphorous screens for viewing or solid-state digital memories, hard disks, or other electronic storage media in an electronic data gathering mode of operation may be used in support of display devices. A direct, visual observation allows a coarse evaluation of the wavefront, assuming that the pulse of a pulsed input lasts long enough or the visual system is equipped with an adjustable length of persistence. Special purpose TV cameras, frame grabbers, etc., are available for this purpose. It is not necessary to process each pixel element simultaneously, which would require extensive parallel processing hardware. A flash of a fringe field can expose a CCD array, which can be read sequentially, the information stored in a semiconductor or other suitable memory and the field of intensity distribution converted to an optical path difference distribution which can be displayed at a convenient later time.

Techniques that have been demonstrated in many configurations in the past years are available to electronically read out a fringe field. For example, heterodyne means may be utilized wherein individual pixels of the fringe pattern are read out by electronically measuring the relative phase at each point of an AC signal and its distribution across the fringe field either serially or in parallel. Other electronic readout means include a "three bucket" or "four bucket" approach. Any of these techniques can be utilized with the present invention.

Figure 2:
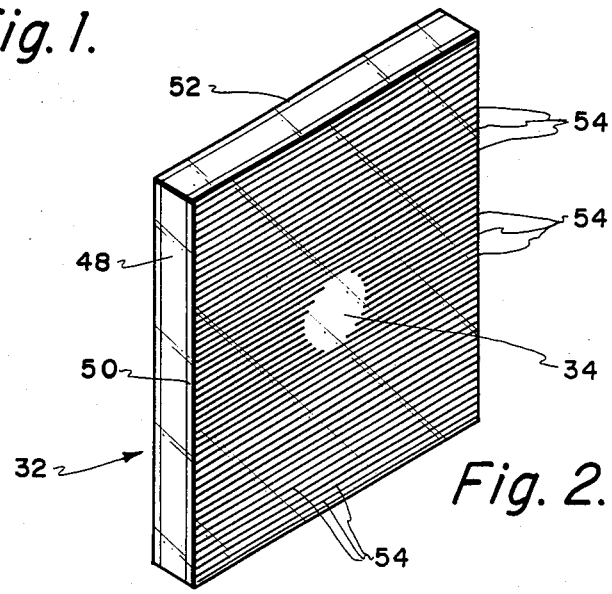
FIG. 2 is a perspective view of the polarizer/aperture component.
Figure 3:
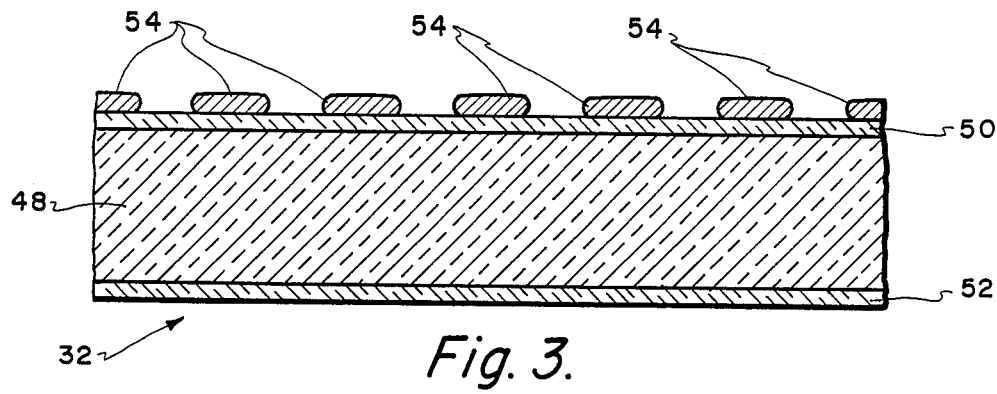
FIG. 3 is a greatly enlarged cross-sectional view of a small portion of the polarizer/aperture component of FIG. 2.

The most critical component of the present invention is the polarizer/aperture component 32 a preferred embodiment of which is illustrated in FIGS. 2 and 3. Polarizer/aperture component 32 includes a transparent optical substrate 48. The substrate 48 preferably has anti-reflective (AR) coatings 50,52 to minimize Fresnel reflection at its boundaries. A wire array of a plurality of substantially parallel submicroscopic conducting strips 54 is formed on one of the coated surfaces. Component 32 must be a high quality, thin optical element which transmits all incident radiation of one polarization undistorted, but only transmits incident radiation of the other polarization through the predefined, small aperture 34 in the center of the component.

High quality, as the term is used herein, includes the following characteristics: (1) the wedge in the substrate 48 should be held at a minimum; (2) inhomogeneities should be held at a minimum, i.e., the optical path length should be uniform across the element; (3) as noted, the surfaces of the substrate 48 should preferably have anti-reflective coatings 50,52; (4) the optical path difference through the aperture 34 should be equal to the optical path difference through the substrate 48 with the AR coatings 50,52 on both sides; (5) there should be high contrast between the two polarizations, i.e., it is desired to have close to 100% transmission in one polarization and 0% transmission in the other; and (6) if the polarizer is of the absorption type, its substrate should have a high enough thermal conductivity to be able to maintain cool operation, especially around the aperture 34, to prevent thermal warping of the substrate 48.

A polarizer/aperture component 32 that satisfies the above requirements may be produced by the following method:

A high quality thin, transparent optical substrate 48, such as glass, fused silica, sapphire, or diamond is provided. Anti-reflective coatings 50,52 are deposited on both sides of the substrate 48. On one side of the coated substrate 48 an array of thin parallel conductive strips 54 is formed. The strips 54 may be formed by various techniques such as electron, ion or laser beam etching or chemically etching thin straight parallel lines in a thin metallic film which is deposited on one side of the coated substrate 48 or deposition of thin metal strips through a mask with parallel slits. These strips 54 may be formed of materials with high optical reflectivity such as aluminum, chromium, gold or silver. To function properly as a high quality polarizer the period of the parallel strips must be less than a fraction of the optical wavelength of the incoming radiation. Such a polarizer transmits the portion of the incoming radiation where the $\overline{E}$ field vector is perpendicular to the strips 54 and reflects the orthogonal polarized component.

It is desired to have a high density (short periodicity) array. A high density results in greater contrast between the two orthogonal polarizations. Using the above method of manufacture extinction ratios of $10^3$ to $10^4$ have been demonstrated with a center to center line separation, i.e. period, of less than $\lambda/10$, where $\lambda$ is the optical wavelength of the incident radiation. A period of $\lambda/5$ to $\lambda/10$ will produce extinction ratios that are acceptable for most of the applications of the present invention.

Once the appropriate line array is produced the small aperture 34 in the center of the line array 54 is formed. Several known methods are available for the aperture formation such as photoresist-chemical etching or electron, ion or laser beam etching. The aperture 34 is only formed in the line array 54; therefore, whatever method is chosen for forming this aperture 34 it should not alter the substrate 48 or anti-reflective coatings 50,52.

The aperture 34 should be circular and its size equal to a fraction of the diffraction limited spot of the focused beams. The diffraction limited spot size depends only on the F number of the focusing optics and the wavelengths of incident radiation.

The resultant structure is an efficient, high-quality polarizer 32 for incident optical beams. When the aperture 34 on this polarizer 32 is exposed to a focused beam, then depending on the polarization of the incident beam, the beam is either substantially transmitted with all its wavefront errors or it is spatially filtered. In other words, the beam will see a spatial filter if the $\overline{E}$ field of the focused beam is parallel to the conductive strips. Furthermore, all of the beam will be transmitted, possibly somewhat attenuated but otherwise unaltered if the $\overline{E}$ field is perpendicular to the conductive strips.

Figure 4:
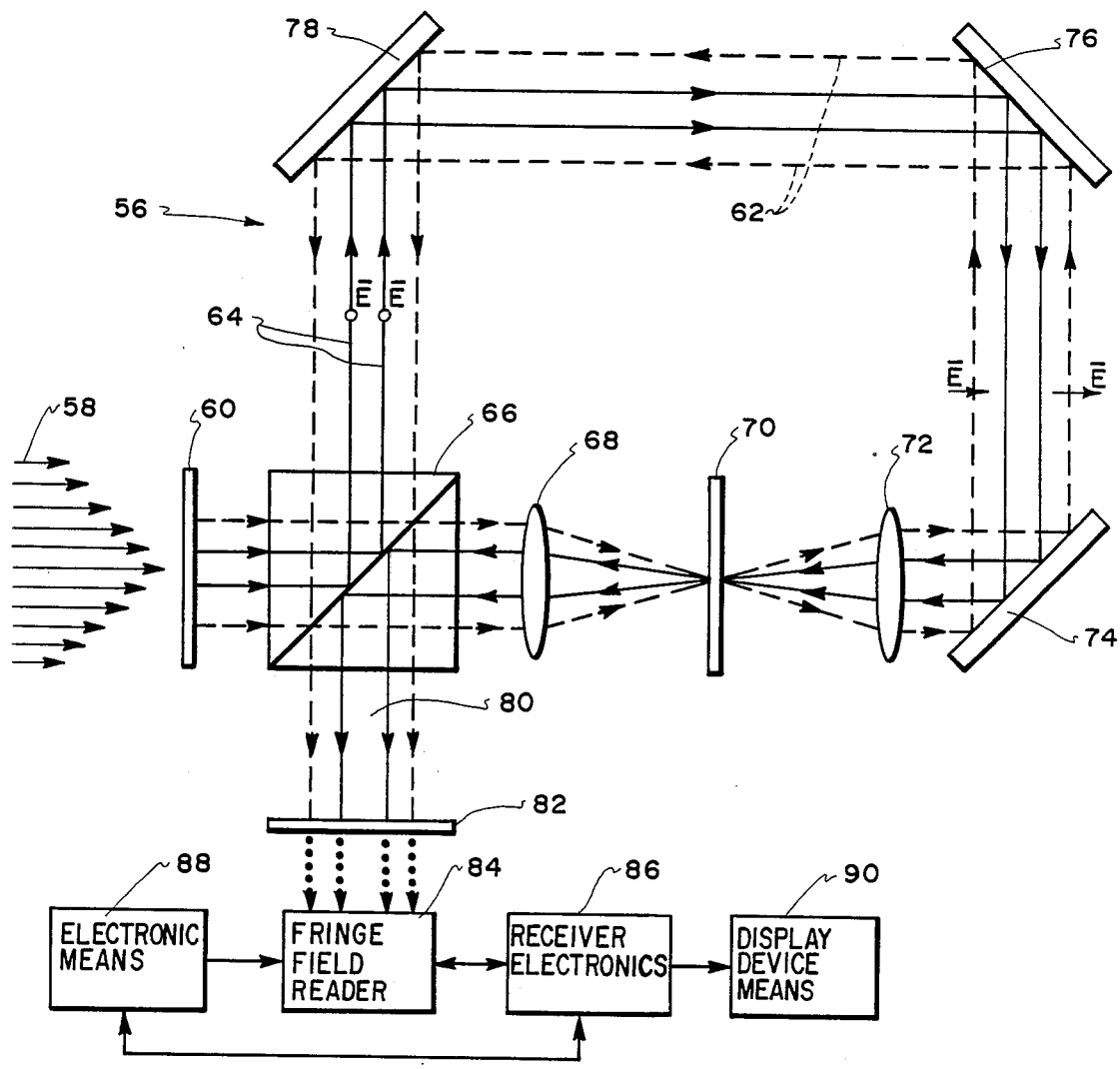
FIG. 4 is a schematic illustration of an embodiment of the wavefront sensor utilizing a modified cyclic interferometer with an odd number of reflections for each beam.

A second embodiment of the invention generally designated 56 is illustrated in FIG. 4. In this embodiment the incoming beam 58 is directed through a polarizer 60 and separated into a P-polarized beam 62 and S-polarized beam 64 by beam splitter 66. The P-polarized beam 62 is directed through a focusing lens 68 and a polarizer/aperture component 70. It is then recollimated by another focusing lens 72, reflected by mirrors 74,76,78 and then returned to beam splitter 66. At that point it is recombined with the S-polarized beam 64 which travels the same path but in the opposite direction. The recombined beam 80 is then sent through a polarizer 82. The resulting interference pattern is read by fringe field reader 84 and analyzed by receiver electronics 86, control electronic means 88 and memory and display device means 90. This embodiment is similar to that of FIG. 1 except that the extra mirror utilized provides an odd number of reflections for each of the two beams. The embodiment of FIG. 1 utilizes fewer components thereby minimizing beam wavefront contamination by any imperfections of the optical component. Although FIG. 4 adds an additional optical component, utilization of an odd number of reflections makes the beam "imprint" of both polarizations on all the optical components identical.

The present invention has the following attributes and characteristics:

1. There is a common path for both the S-polarized and P-polarized beams. It is noted that in all embodiments the same optical components are encountered by both the reference and the unperturbed beam and the angles of incidence on all the optical surfaces are also identical. By providing a common path, wavefront aberrations that are caused by apparatus 10, as a whole, are essentially cancelled out. Furthermore, as previously noted, in embodiments utilizing an odd number of reflections, wavefront aberrations that are caused by imperfections of the optical components of the apparatus are also essentially cancelled out.

2. The sample beam, i.e. the beam that does not see the aperture, remain largely undisturbed. The present invention uses a minimal number of optical components. Optical components, with the exception of the two lenses, are at places where the beams are collimated even in the focal point (i.e., angle of incidence at optical surfaces is constant across the beam cross-section), therefore instrument induced astigmatism is eliminated.

3. There are no back reflections or multi-reflections in the system. The only component that could cause problems if not handled properly is the polarizer/aperture component 32. In practically all applications the back reflected part of the spatially filtered component will leave the ring interferometer via the entrance and will leave the fringe field at the receiver plane largely intact. A small amount of tilt of the polarizer/aperture component 32 will take care of any unusual circumstances.

4. There are no wave plates. Wavelength sensitive components (with the possible exception of the polarizer/aperture component 32) are eliminated from the system. There are no quarter-wave or half-wave plates.

Such plates are optical components that are very wavelength (and angle of incidence) sensitive. Furthermore, if a waveplate is used in conjunction with a wavefront sensor the spatial variation of the incident angle across the beam cross-section of a converging or diverging beam would produce a spatially varying amount of contamination by the orthogonal component of polarization which would degrade fringe contrast and wavefront data accuracy.

5. Beam combining is essentially loss-free. If a neutral density (or a multi-layer dielectric coated) beam splitter is used to combine the undisturbed wavefront with the reference beam, one-half or three-quarters of the combined beam is lost depending on the optical configuration that is used. The present invention utilizes all of the incident power and does so without waveplates.

6. The present invention is wavelength insensitive. Because there are no wavelength-sensitive components in the system it is largely insensitive to wavelength variations.

7. The device is very simple. It is easy to set up and, with the exception of the polarizer/aperture component 32, the components are available off-the-shelf. Alignment of the system is also simple.

Obviously, many modifications and variations of the present invention are possible in light of the above teachings. For example, the conventional linear polarizer 14 may not be necessary if the source and its radiation field is already polarized. In this case a polarization rotator may be utilized at the entrance to allow adjustment of the relative beam intensities in the two oppositely traveling waves to maximize interference fringe contrast. It is therefore to be understood that, within the scope of the appended claims, the invention may be practiced otherwise than as specifically described.

What is claimed and desired to be secured by Letters Patent of the United States is:

1. An apparatus for sensing and measuring the quality of the wavefront of a substantially collimated incoming optical beam, comprising:
   (a) a polarizing beam splitter for separating said wavefront into an S-polarized beam and a P-polarized beam;
   (b) beam directing means for directing said P-polarized and S-polarized beams along a common closed path but in opposite directions;
   (c) focusing means for focusing the P-polarized and S-polarized beams at a common focal region on said path and recollimating each beam after it passes through said focal region;
   (d) a polarizer with an optical aperture, said polarizer located in said focal region and being positioned such that said aperture is centered on the centroid of the focused beams, said polarizer being angularly oriented about an optical axis of the closed path so that it transmits substantially all of the beam traveling in one direction and is an effective optical spatial filter for the beam traveling in the opposite direction;
   (e) means for directing said beams along a second common path after each is passed through said polarizer and recollimated;
   (f) means for orienting the polarizations of said beams traveling along said second common path into a common plane of polarization thereby causing them to interfere; and
   (g) means for reading the resulting optical interference fringe pattern and thereby determining the quality of the incoming optical beam.

2. The apparatus of claim 1 further including a second polarizer for polarizing an unpolarized incoming optical beam, said second polarizer being a conventional linear polarizer located on the path of said unpolarized incoming optical beam prior to it impinging on said polarizing beam splitter.

3. The apparatus of claim 1 wherein said beam directing means includes at least two mirrors.

4. The apparatus of claim 3 wherein said beam directing means includes a first and a second mirror, said first mirror being positioned to receive the P-polarized beam from said polarizing beam splitter and directing it toward said second mirror, said second mirror being positioned to receive the S-polarized beam from said polarizing beam splitter and directing it toward said first mirror, said polarizer with an optical aperture being located between said first and second mirrors.

5. The apparatus of claim 4 wherein said focusing means includes two focusing lenses each lens being positioned between said polarizer and one of said mirrors, said focusing lenses for forming said focal region.

6. The apparatus of claim 1 wherein said focusing means are diffraction limited.

7. The apparatus of claim 6 wherein said aperture is sized on the order of the diffraction limited spot of the focused beams.

8. The apparatus of claim 7 wherein said polarizer with an optical aperture includes a transparent optical substrate with a wire array formed thereon, said wire array comprising a plurality of substantially parallel submicroscopic conducting strips having a periodicity of $\lambda/5$ or less, wherein $\lambda$ is the wavelength of the incoming optical beam.

9. The apparatus as claimed in claim 8 wherein said substrate includes a front and a back surface, the front surface having said wire array deposited thereon, said aperture being circular and extending through said array but not through said substrate.

10. The apparatus of claim 8 wherein said substrate includes two surfaces, each of said surfaces having an anti-reflective coating thereon, said wire array being deposited on one of the anti-reflective coatings formed on said surfaces, said aperture being circular and extending through said array but not through said substrate or anti-reflective coatings.

11. The apparatus of claim 8 wherein said array is comprised of a high optical reflectivity material selected from the group consisting of aluminum, chromium, gold and silver.

12. The apparatus of claim 8 wherein said substrate is comprised of a material selected from the group consisting of glass, quartz, sapphire and diamond.

13. The apparatus of claim 1 wherein said optical interference fringe pattern is read by visual means.

14. The apparatus of claim 1 wherein said optical interference fringe pattern is read by electronic means.

15. The apparatus of claim 14 wherein said electronic means includes a four bucket detecting means.

16. The apparatus of claim 15 wherein said electronic means includes heterodyne means wherein OPD data at individual pixels of the fringe pattern are read out serially.

17. The apparatus of claim 15 wherein said electronic means includes heterodyne means wherein OPD data at individual pixels of the fringe pattern are read out in parallel.

18. The apparatus of claim 14 wherein said electronic means includes a three bucket detecting means.

19. The apparatus of claim 1 wherein said incoming optical beam is continuous.

20. The apparatus of claim 1 wherein said incoming optical beam is pulsed.

21. The apparatus of claim 1 wherein said polarizer with an optical aperture includes:
 a thin transparent optical substrate having two surfaces each on opposite sides of the substrate; and
 a dense array of submicroscopic, parallel, electrically conductive, optically reflective strips formed on one of said surfaces, said array having a small circular aperture formed in its center having a diameter on the order of the diffraction limited spot of the focused beams.

22. A method for sensing and measuring the quality of the wavefront of a substantially collimated incoming optical beam, comprising the steps of:
 (a) separating said wavefront into a P-polarized beam and an S-polarized beam;
 (b) directing the P-polarized and S-polarized beams along a common closed path but in opposite directions to one another;
 (c) focusing the P-polarized and S-polarized beams at a common focal region on said path and recollimating each beam after it passes through said focal region;
 (d) providing a polarizer with an optical aperture in said focal region, said polarizer being positioned such that said aperture is centered on the centroid of the focused beams, said polarizer being angularly oriented about an optical axis of the closed path so that it transmits substantially all of the beam traveling in one direction and is an effective optical spatial filter for the beam traveling in the opposite direction;
 (e) directing the beams from step (d) along a second common path after each is passed through said polarizer and recollimated;
 (f) orienting said beams from step (e) into a common plane of polarization thereby causing them to interfere; and
 (g) reading the resulting optical interference fringe pattern for determining the quality of the incoming optical beam.

23. The method of claim 22 further including the step of polarizing an unpolarized incoming optical beam prior to separating said unpolarized incoming optical beam into a P-polarized beam and an S-polarized beam.

24. The method of claim 22 wherein said means for directing said P-polarized and S-polarized beams along a common closed path includes a plurality of mirrors.

25. The method of claim 22 wherein said P-polarized and S-polarized beams are focused to their diffraction-limited sizes.

26. The method of claim 25 wherein said aperture is sized on the order of the diffraction-limited spot of the focused beams.

* * * * *